US008668424B2

(12) United States Patent
Niemeyer et al.

(10) Patent No.: US 8,668,424 B2
(45) Date of Patent: Mar. 11, 2014

(54) CIRCULAR BIN UNLOAD SYSTEM AND METHOD

(75) Inventors: Douglas J. Niemeyer, Granger, IN (US); Mark S. Dingeldein, Milford, IN (US)

(73) Assignee: CTB, Inc., Warsaw, IN (US)

( * ) Notice: Subject to any disclaimer, the term of this patent is extended or adjusted under 35 U.S.C. 154(b) by 599 days.

(21) Appl. No.: 12/827,448

(22) Filed: Jun. 30, 2010

(65) Prior Publication Data

US 2012/0003066 A1 Jan. 5, 2012

(51) Int. Cl.
*B65G 65/00* (2006.01)

(52) U.S. Cl.
USPC ............................................. 414/304; 52/197

(58) Field of Classification Search
USPC ......... 414/304, 288, 213, 216, 306, 310, 328, 414/287; 52/192, 193, 194, 195, 197, 264, 52/302.1, 302.2, 302.3, 302.7, 169.5; 366/186, 189, 190, 12, 192, 266, 184, 366/133; 222/413
See application file for complete search history.

(56) References Cited

U.S. PATENT DOCUMENTS

| | | | | |
|---|---|---|---|---|
| 1,045,522 A | * | 11/1912 | Conzelman | 52/236.3 |
| 1,421,763 A | * | 7/1922 | Caldwell | 52/199 |
| 2,003,868 A | * | 6/1935 | Shodron | 119/449 |
| 2,410,338 A | * | 10/1946 | Craine | 52/198 |
| 2,722,171 A | * | 11/1955 | Deringer | 99/646 R |
| 2,815,987 A | * | 12/1957 | Sylvest | 406/90 |
| 2,897,926 A | | 8/1959 | Hawthorne | |
| 3,057,522 A | * | 10/1962 | Reed | 222/285 |
| 3,064,830 A | * | 11/1962 | Reed | 414/310 |
| 3,095,098 A | * | 6/1963 | Maalphie | 198/360 |
| 3,193,117 A | * | 7/1965 | Best | 414/306 |
| 3,237,295 A | | 3/1966 | Konzak | |
| 3,373,982 A | * | 3/1968 | Jones, Jr. | 414/214 |
| 3,465,654 A | * | 9/1969 | Fox | 404/4 |
| 3,513,994 A | * | 5/1970 | De Bower et al. | 414/310 |
| 3,514,158 A | * | 5/1970 | Greene et al. | 406/91 |
| 3,528,568 A | | 9/1970 | Romberg | |
| 3,563,399 A | | 2/1971 | Shivers | |
| 3,563,610 A | * | 2/1971 | Speegle et al. | 406/91 |
| 3,581,916 A | * | 6/1971 | Brumagim | 414/308 |
| 3,638,331 A | * | 2/1972 | Steffen | 34/231 |
| 3,714,718 A | * | 2/1973 | Sukup | 34/573 |
| 3,756,469 A | * | 9/1973 | Clark et al. | 222/105 |
| 3,809,260 A | * | 5/1974 | Zimmerman | 414/324 |
| 3,824,705 A | * | 7/1974 | Ives | 34/170 |

(Continued)

OTHER PUBLICATIONS

Hutchinson Products, Hutchinson Grain Pump Information Sheet, www.hutchinson-mayrath.com; Nov. 2009.

(Continued)

*Primary Examiner* — Saul Rodriguez
*Assistant Examiner* — Glenn Myers
(74) *Attorney, Agent, or Firm* — Harness, Dickey

(57) ABSTRACT

An unloading system for a storage bin and related method are provided. The unloading system can have a sump configuration that includes a foundation having a floor and a foundation footing. A central tunnel can be formed in the foundation that terminates at a tunnel opening on a perimeter of the foundation. A primary sump can be formed through the floor at a location generally near a centerpoint of the storage bin and connected to the central tunnel. At least one radial sump can be formed in the floor at a location radially offset from the central tunnel and located generally between the primary sump and a sidewall of the storage bin.

14 Claims, 6 Drawing Sheets

(56) References Cited

U.S. PATENT DOCUMENTS

| | | | |
|---|---|---|---|
| 3,926,814 A * | 12/1975 | Hogarth | 210/323.2 |
| 4,015,734 A * | 4/1977 | Laidig | 414/310 |
| 4,218,859 A | 8/1980 | Sams | |
| 4,361,254 A | 11/1982 | Teraoku et al. | |
| 4,462,743 A | 7/1984 | Romberg | |
| 4,585,385 A * | 4/1986 | Buschbom et al. | 414/311 |
| 4,625,478 A * | 12/1986 | Goode | 52/197 |
| 4,790,111 A | 12/1988 | Johinke | |
| 5,194,275 A | 3/1993 | Greer | |
| 5,709,260 A * | 1/1998 | Wagstaff et al. | 164/453 |
| 5,860,221 A | 1/1999 | Morrison et al. | |
| 7,392,624 B2 | 7/2008 | Kinzer | |
| 7,544,031 B2 | 6/2009 | Kaeb et al. | |
| 2007/0036024 A1 * | 2/2007 | Kubala et al. | 366/163.2 |
| 2009/0242577 A1 | 10/2009 | Dingeldein et al. | |

OTHER PUBLICATIONS

Brock Owner/Operator's Manual, Commercial and Farm Bins, MCB1416B; Jan. 2003.

Hutchinson/Mayrath Grain Pump Loop Conveyor Information; 02859A, 01236A2; Nov. 2008.

International Preliminary Report on Patentability, including Written Opinion of the International Searching Authority mailed Jan. 17, 2013, in corresponding PCT/US2011/040898 application.

"Series 12-Series 17 for the Bulk Material Handling & Processing industries", intersystems, En-Masse Conveyors, 2009, www.intersystems.net.

* cited by examiner

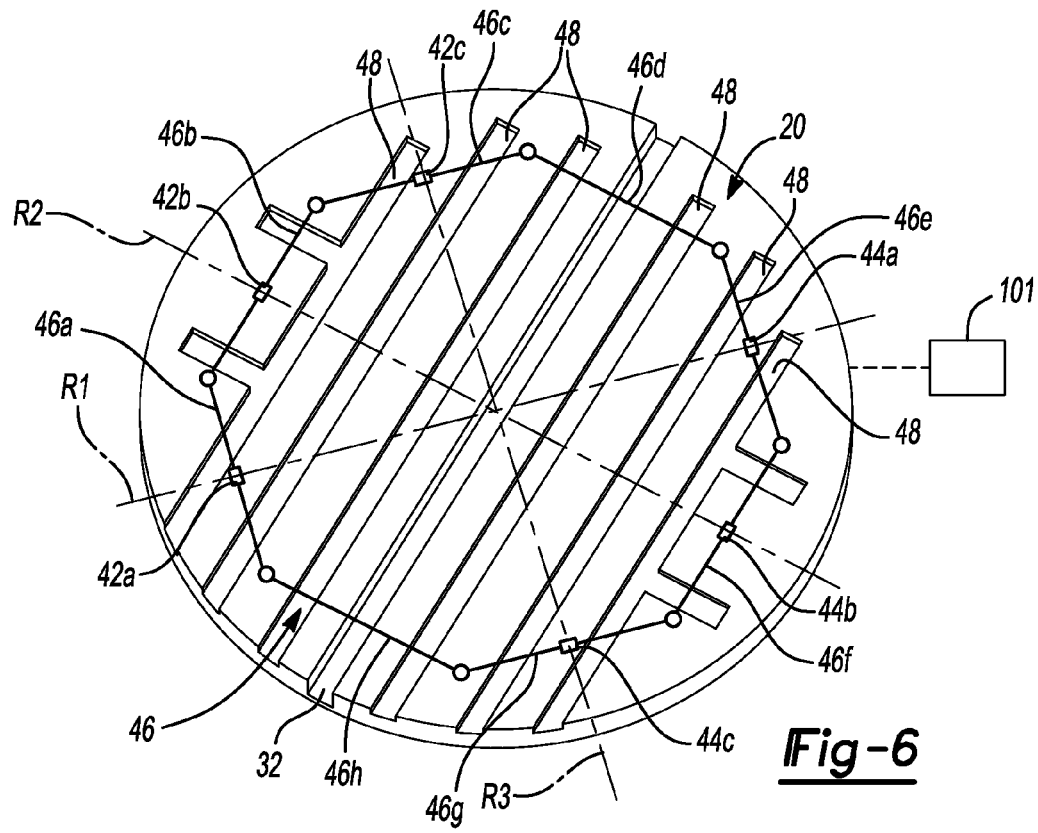
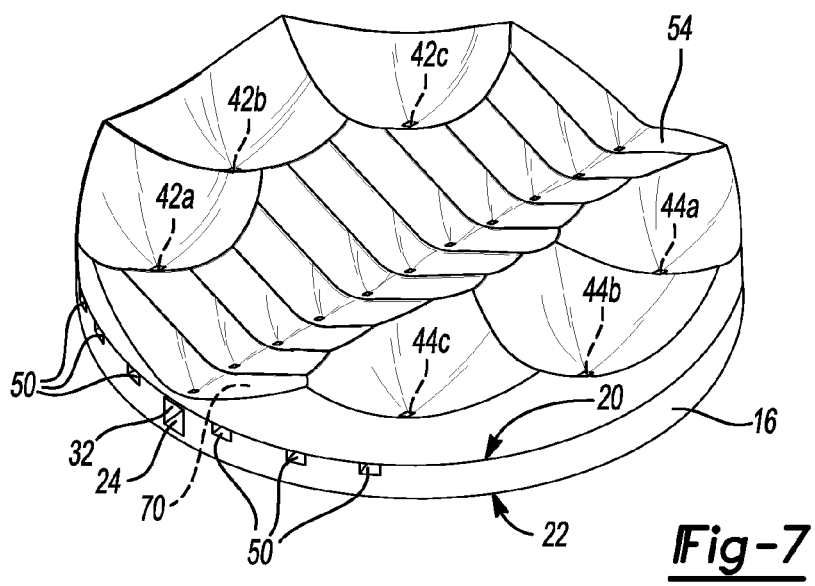

CIRCULAR BIN UNLOAD SYSTEM AND METHOD

FIELD

The present disclosure relates to commercial storage bins and more particularly to systems and methods for removal of material out of the storage bin.

BACKGROUND

The statements in this section merely provide background information related to the present disclosure and may not constitute prior art.

Commercial storage bins for materials, such as grain may include a roof and a wall structure formed from a number of corrugated sheets and vertical column members. The storage bin structure can be constructed on concrete foundations that can also provide a floor for the storage bin. Integrated into the foundation may be various trenches for grain aeration. The grain can be supported above these aeration trenches by apertures in the floor. In addition, various sumps or holes can be formed through the floor that lead to a central tunnel for removing grain through a discharge opening. The sumps or holes through the floor can be formed along a central axis above the central tunnel. Each sump can have a gate or mechanism to provide an open or closed position for the material to discharge into the central tunnel. In the central tunnel, conveyors, augers or other material moving mechanisms can move material toward the discharge opening to control the flow of material out of the storage bin.

Grain storage and handling has taken on new dynamics as the grain bins increase capacities. In this regard, the grain bins have become taller and larger in diameter and the amount of grain left within the bin after emptying through conventional gravity unloading methods has become a challenge to economically and efficiently handle. It can be desirable to satisfactorily empty the bin while reducing or eliminating the need for supplemental sweeping in addition to gravity unloading. The different free-flowing material or grain commodities stored in these bins has become a more valuable product and the cost to load and unload the stored product has a significant impact on efficiency of operations.

SUMMARY

This section provides a general summary of the disclosure, and is not a comprehensive disclosure of its full scope or all of its features.

A sump configuration for a storage bin is provided. The sump configuration can include a foundation having a floor and a foundation footing. A central tunnel can be formed in the foundation that terminates at a tunnel opening on a perimeter of the foundation. The central tunnel can extend along an intersecting plane that generally bisects the floor into a first and a second half-circle. A primary sump can be formed through the floor at a location generally near a centerpoint of the storage bin and connected to the central tunnel. At least one radial sump can be formed in the floor at a location radially offset from the central tunnel and the intersecting plane and located generally between the primary sump and a sidewall of the storage bin.

According to additional features, the radial sump can comprise a first plurality of radial sumps that are arranged on one side of the central tunnel and a second plurality of radial sumps that are arranged on another side of the central tunnel. A radial sump of the first plurality of radial sumps can be symmetrically aligned relative to the primary sump from a corresponding radial sump of the second plurality of radial sumps. A first plurality of intermediate sumps can be arranged through the floor between the primary sump and the tunnel opening. A second plurality of intermediate sumps can be arranged through the floor in an aligned position with the central tunnel and located between the primary sump and the sidewall assembly. According to one configuration, a material transfer device can be disposed in the central tunnel that is operable to remove material that passes through the primary sump to the tunnel opening.

An exemplary method of unloading a storage bin according to the present teachings can include a sequence of manual opening and activating of various sumps and/or material moving devices provided in respective tunnels formed in a grain bin foundation. The method can include opening a primary sump located in the foundation of the grain bin at a location substantially at a centerpoint of the grain bin. The grain that passes through the primary sump can be moved through a central tunnel and out of the grain bin. A radial sump located in the foundation at a location between the primary sump and a sidewall of the grain bin can be opened. The radial sump can be located at a position radially offset from the central tunnel. The grain that passes through the radial sump can be moved to the central tunnel and/or to a perimeter of the grain bin. Additionally, a plurality of radial sumps arranged around the foundation can be sequentially opened.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a perspective view of the foundation of FIG. 2 and shown with the floor, primary sump and first and second intermediate sumps removed for illustrative purposes;

FIG. 7 is an exemplary subsequent unloading step comprising sequential opening of the respective radial sumps according to one example of the present teachings;

Corresponding reference numerals indicate corresponding parts throughout the several views of the drawings.

DETAILED DESCRIPTION

Figure 1:
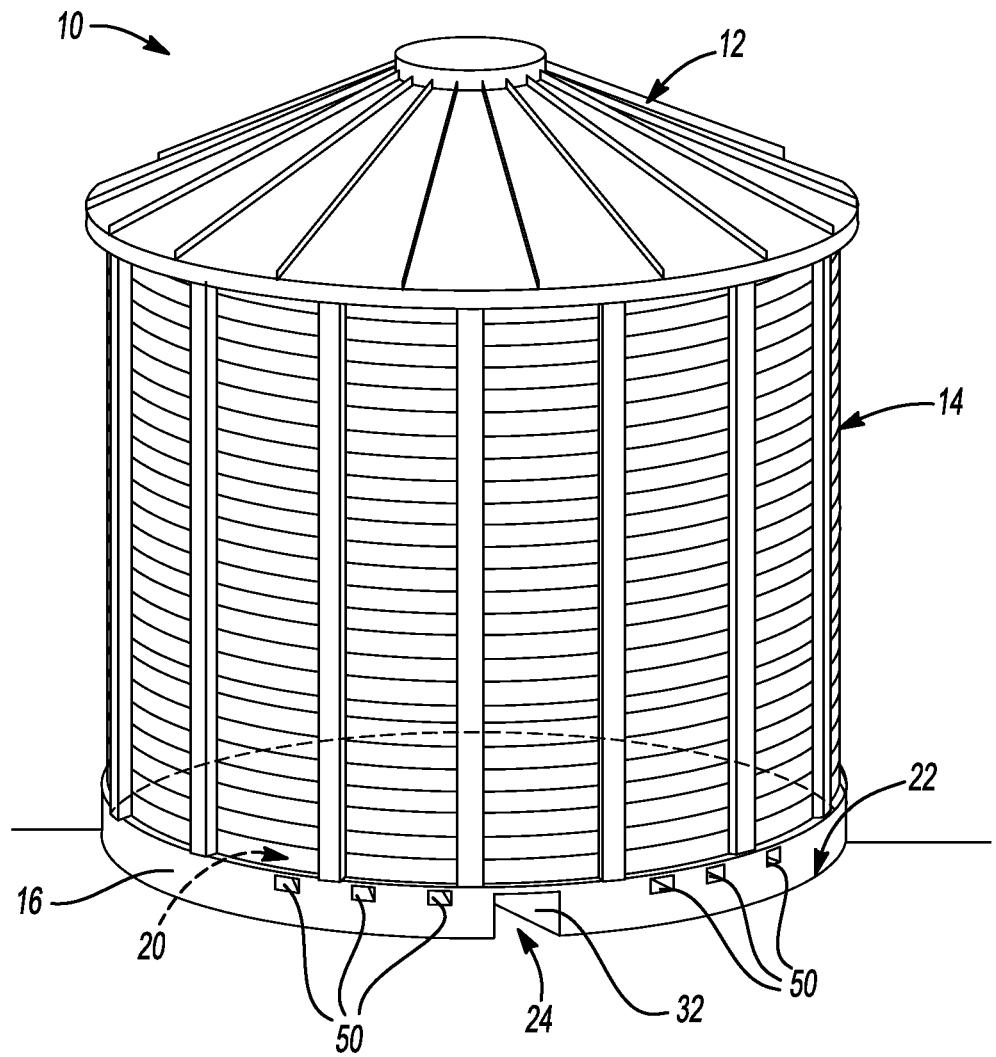
FIG. 1 is a front perspective view of an exemplary storage bin that incorporates the sump configuration constructed in accordance to one example of the present teachings.

The following description is merely exemplary in nature and is not intended to limit the present disclosure, application, or uses. It should be understood that throughout the drawings, corresponding reference numerals indicate like or corresponding parts and features.

With initial reference now to FIG. 1, a storage bin constructed in accordance with one example of the present teachings is shown and generally identified at reference numeral 10. The storage bin 10 may be used for storing a variety of materials including various grains. The storage bin 10 may include a roof assembly 12 that is fixed to a sidewall assembly 14. The sidewall assembly 14 can generally sit on top of a foundation 16. The foundation 16 can be constructed of concrete to generally form a floor 20 and a foundation footing 22. The floor 20 can be comprised of concrete alone, or of concrete and other materials. One or more aeration trenches 48 can be formed into the floor 20. Metal grates (not specifically shown) can be positioned over the aeration trenches 48. Formed through an outer perimeter of the foundation 16 can be an unload tunnel opening 24 in which material can be directed out of the storage bin 10 as will become appreciated from the following discussion.

Figure 2:
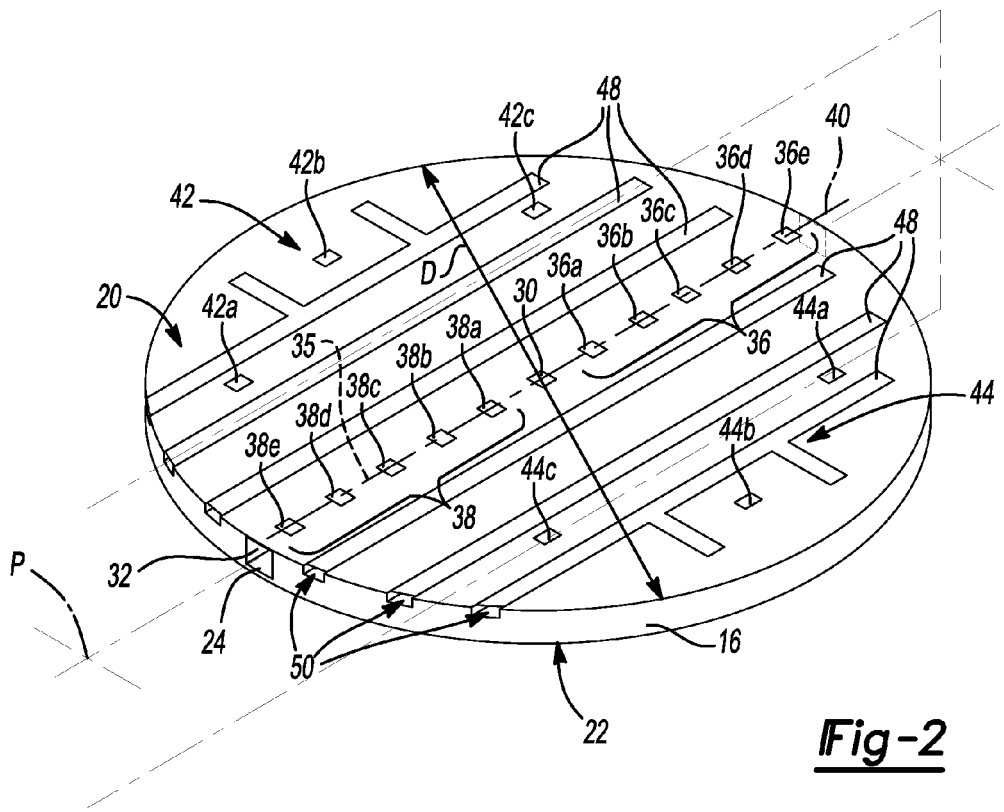
FIG. 2 is a perspective view of the foundation of the storage bin shown in FIG. 1 and incorporating a plurality of radial sumps according to one example of the present teachings.

With further reference now to FIG. 2, additional features of the foundation 16 will be described in greater detail. A center or primary sump 30 can be formed through the floor 20 that communicates with a central tunnel 32 formed generally between the floor 20 and the foundation footing 22 of the foundation 16. A plane P can be defined through the central tunnel 32 that generally bisects the foundation 16 into a first and a second half-circle. The central tunnel 32 can comprise or include a conventional high capacity drag system or belt conveyor material transfer device 35 as is known in the art. One suitable material transfer device is an "En-Masse Conveyor, Series 17" offered by Intersystems Inc., of Omaha Nebraska. Other material transfer devices may be used. In one example, the primary sump 30 can be located at or near a centerpoint of a diameter D across the floor 20. A plurality of rear intermediate sumps collectively referred to at reference numeral 36 and individually identified at reference numerals 36a, 36b, 36c, 36d and 36e can be formed in the floor 20 for communicating material into the central tunnel 32. A plurality of front intermediate sumps collectively referred to at reference numeral 38 and individually identified at reference numerals 38a, 38b, 38c, 38d and 38e can also be formed in the floor 20 for communicating material into the central tunnel 32. The terms "rear" and "front" are used simply to denote their respective locations relative to the opening 24 of the tunnel 32. In one example, the rear intermediate sumps 36, the primary sump 30 and the front intermediate sumps 38 can be formed along a central radial axis 40 located above and aligned in a parallel relationship with the tunnel 32. In this regard, the plane P can extend through the intermediate sumps 36, 38 and the primary sump 30. In one configuration, each sump 36, 38 can be located between ten and fifteen feet apart from an adjacent sump 36, 38.

A first plurality of radial sumps collectively referred to at reference numeral 42 and individually identified at reference numerals 42a, 42b and 42c can be formed in the floor 20 on one side of the tunnel 32. A second plurality of radial sumps collectively referred to at reference numeral 44 and individually identified at reference numerals 44a, 44b and 44c can be formed on another side of the tunnel 32. In one example, each of the first radial sumps 42 has a corresponding second radial sump 44 on an opposite side of the primary sump 30. Explained differently, the first and second radial sumps 42 and 44 can be formed symmetrically relative to the primary sump 30 and about the tunnel 32 wherein sump 42a is symmetrically aligned along a radius R1 (FIG. 6) with sump 44a. Similarly, sump 42b is symmetrically aligned along a radius R2 with sump 44b and sump 42c is symmetrically aligned along a radius R3 with sump 44c. In general, the first and second radial sumps 42 and 44 can be arranged in a circular pattern (see also FIG. 8) at an intermediate distance between the primary sump 30 and the bin sidewall assembly 14 (FIG. 1) to improve removal of the material from the storage bin 10 during an unloading sequence. A series of connecting tunnels forming a closed polygon or loop collectively referred to at reference 46 (see also FIG. 8) and individually identified at reference numerals 46a, 46b, 46c, 46d, 46e, 46f, 46g, 46h can connect the first and second radial sumps 42 and 44. While the connecting tunnels 46 are described herein as distinct segments, one continuous connecting tunnel 46 (e.g., in the form of a circular loop) can be incorporated. The connecting tunnels 46d and 46h intersect the central tunnel 32. As will be described herein, the connecting tunnels 46 can have one or several material transfer devices 47 therein that transport material collected through the first and second radial sumps 42 and 44 to the central tunnel 32.

The plurality of aeration trenches 48 can be formed in the floor 20 on both sides of the central tunnel 32. The aeration trenches 48 can lead to respective aeration tunnel openings 50 around a perimeter of the foundation 16 through which air enters the grain storage bin 10. The aeration trenches 48 can be generally much shallower and in some cases located above the central tunnel 32. Other configurations are contemplated for providing aeration through the floor 20.

Figure 3:
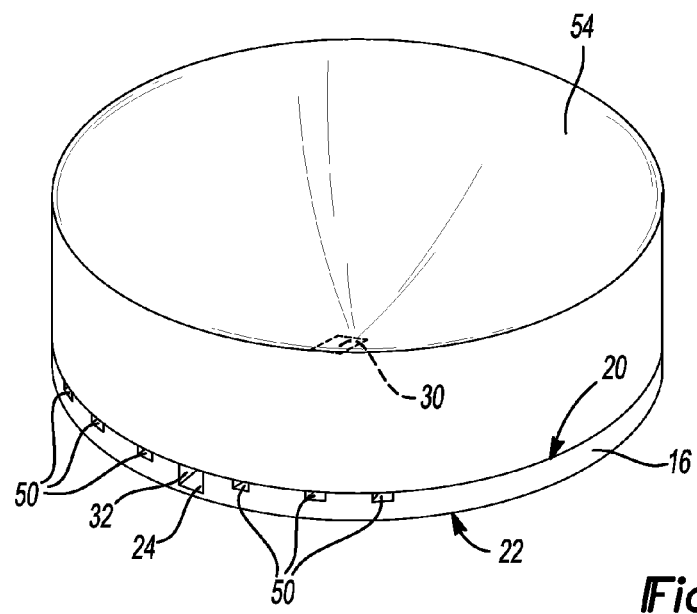
FIG. 3 is a perspective view illustrating an exemplary first unloading step that includes the opening of a primary sump.
Figure 4:
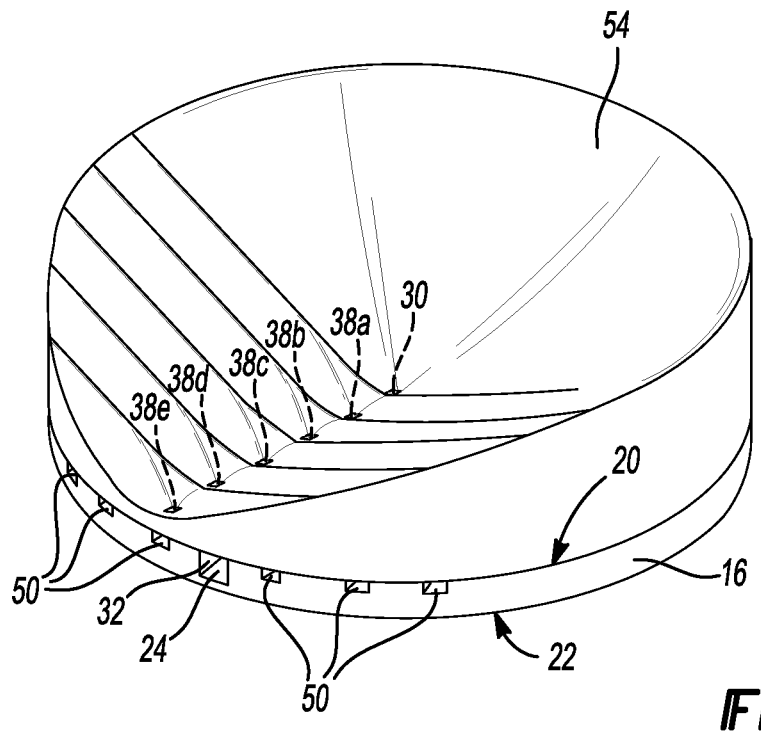
FIG. 4 illustrates a second exemplary unloading sequence wherein a first plurality of intermediate sumps are sequentially opened.
Figure 5:
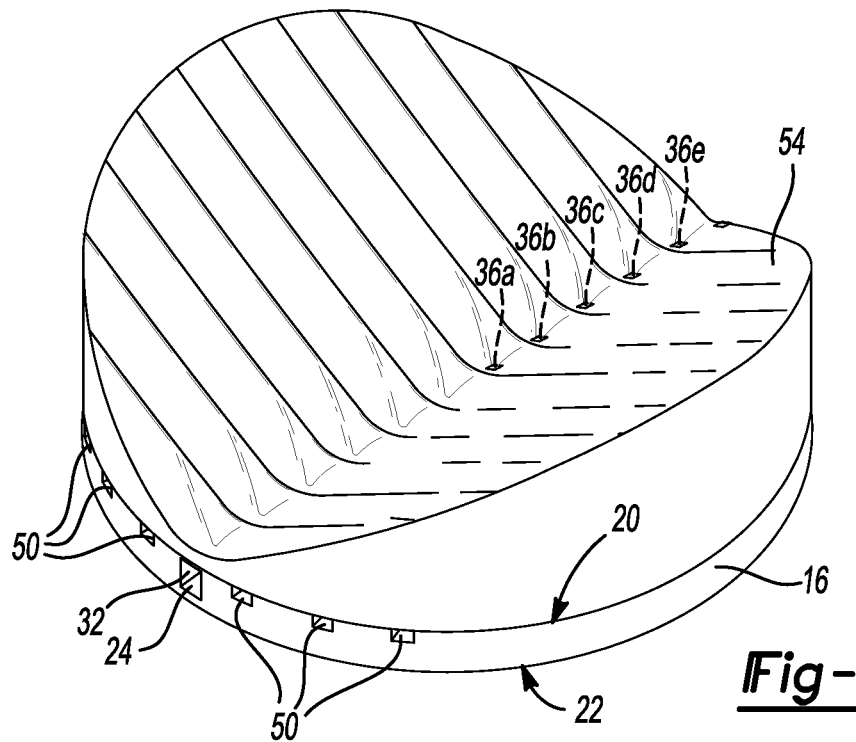
FIG. 5 is a perspective view of an exemplary subsequent unloading step where a second plurality of intermediate sumps are sequentially opened.

Turning now to FIGS. 3-5, an unloading sequence according to the present teachings will be described. At the outset, the primary sump 30 can be opened. Unloading through the primary sump 30 takes place first to maintain the structural integrity of the sidewall assembly 14 and the storage bin 10 as a whole. This keeps grain from moving along the sidewall assembly 14. The outer shell cylindrical shape is maintained by uniform grain pressure when filled. If pressure is reduced by flowing grain or grain movement along the sidewall assembly 14, sidewall deformation can take place and potentially compromise the structural stability of the storage bin 10.

The primary sump 30 can be opened according to any conventional method, such as by opening a conventional gate or mechanism (not specifically shown) provided at the primary sump 30. At this point, gravity can draw as much material (such as grain labeled at reference numeral 54) as possible through the primary sump 30. This can result in influencing the material 54 to take an inverted cone shape as shown in FIG. 3. As the material 54 passes through the primary sump 30, the material 54 can then be directed through the central tunnel 32, such as by any conventional method and out of the opening 24. As discussed herein (FIG. 8), a material transfer device 35 can be used to communicate material 54 through the central tunnel 32. Other devices may be additionally or alternatively provided. Alternatively, the grain 54 can be removed from the central tunnel 32 with a conventional chain drive paddle grain removal device.

With specific reference now to FIG. 4, in the next exemplary step, the front intermediate sumps 38 can be sequentially opened starting with the front intermediate sumps 38a located adjacent to the primary sump 30. The sequential opening of the respective front intermediate sumps 38 from the center and continuing (through sumps 38b-38d) until the front intermediate sump 38e closest to the sidewall assembly 14 can result in the material 54 taking on the shape illustrated in FIG. 4. In other examples, the intermediate sumps 38a-38e may be opened simultaneously.

With reference now to FIG. 5, further unloading is continued by opening the rear intermediate sumps 36. The rear intermediate sumps 36 can be opened sequentially (or simultaneously) starting from the rear intermediate sump 36a nearest to the center sump 30 and continuing through sumps 36b-36d towards the opposite wall 14 until sump 36e. As an alternative, the rear sump 36a nearest the center sump 30, and then the front sump 38a nearest the center sump 30 can be opened, and continuing to alternate front to rear and from center to the outermost sumps 36e and 38e. This stage of unloading grain can result in the grain taking the shape illustrated in FIG. 5. Again, a user can remove as much material 54 as possible by the gravity flow of the material 54 through the front and rear intermediate sumps 38 and 36, respectively. The sequential opening of the respective front and rear intermediate sumps 38 and 36 can assist in keeping the material forces on the sidewall assembly 14 as uniform as possible.

With reference now to FIGS. 6 and 7, opening of the first and second radial sumps 42 and 44 will now be described. In the exemplary embodiment described herein, the connecting tunnels 46 that connect the first and second radial sumps 42 and 44 can be arranged in a generally circular pattern at an intermediate distance between the primary sump 30 (or centerpoint of the storage bin 10 as a whole) and the bin sidewall assembly 14. While the exemplary embodiment is generally shown as forming an octagon profile or ring on the floor 20, other patterns may be used. Moreover, additional or fewer radial sumps 42, 44 may be provided. In the exemplary configuration, each opposing radial sump 42 and 44 can cooperate to form a generally rectangular profile on the octagon shape. In the exemplary embodiment, each of the sumps of the first radial sumps 42 are located at a uniform incremental distance apart from each other to maximize discharging a portion of the remaining material 54 in the storage bin 10. Similarly, each of the radial sumps 44 can be located at a uniform incremental distance apart from each other to maximize discharging a portion of the remaining material 54 from the storage bin 10. It will be appreciated that additional radial sumps can be provided on the floor, such as along corresponding radial axes R1, R2 and/or R3. In fact, multiple octagons or rings of radial sumps 42, 44 can be provided.

Figure 8:
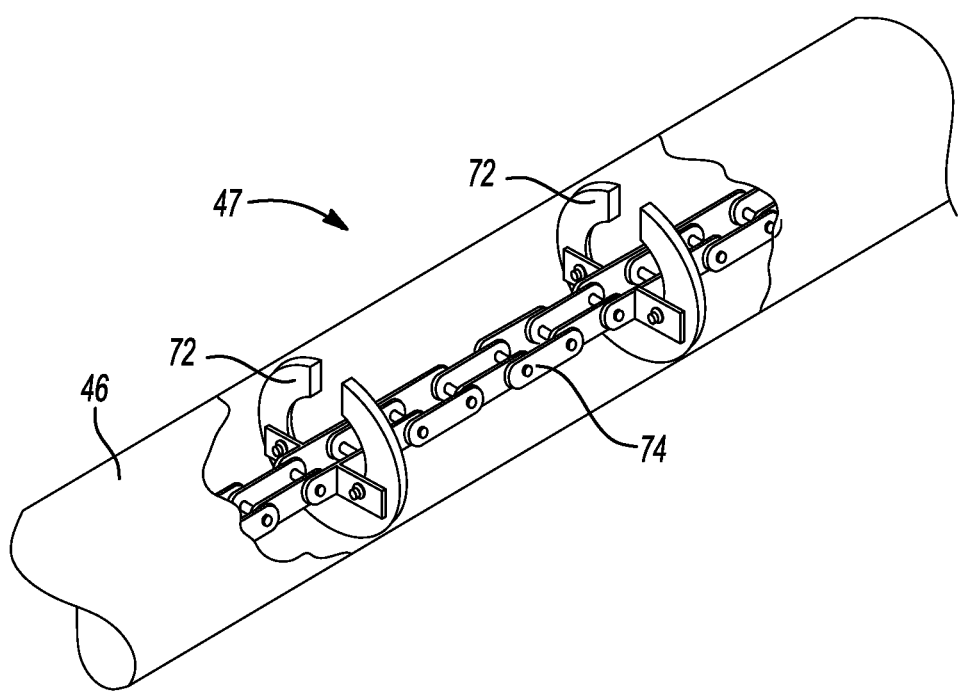
FIG. 8 is a perspective, partial cut-away view of an exemplary material moving device that can be used with the sump configuration of the present disclosure.

With reference now to FIG. 8, one exemplary configuration may be used to remove the material 54 that discharges through the radial sumps 42 and 44. According to one example of the present teachings, the material 54 that discharges through the radial sumps 42 and 44 can be communicated to the central tunnel 32 (and/or to other openings formed on a perimeter of the foundation 16) by way of one or a plurality of material transfer devices 47. The exemplary material transfer devices 47 can generally include a series of paddles 72 connected through a chain 74 and driven linearly or arcuately through respective cylindrical tunnels 46. One suitable material transfer device 47 is marketed under the name Hutchinson Grain Pump™, manufactured by Global Industries, Inc. of Grand Island, Nebr. Other configurations and/or material moving devices can be used for communicating the material 54 from the radial sumps 42 and 44 to the primary sump 30 for subsequent removal or directly out of the storage bin 10.

With reference now to FIG. 7, when the material 54 is discharged from the radial sumps 42 and 44, the end result can resemble the pattern shown in FIG. 7 with multiple inverted cones with the cone apex at the floor 20 at each discharge location where the stored material 54 is gravity fed through the respective radial sumps 42 and 44. The sump configuration of the instant disclosure can facilitate removal of more material 54 from the storage bin 10 as compared to other conventional storage bins that may employ only a primary sump 30 (FIG. 3) or a combination of the primary sump 30 and front and rear intermediate sumps 38 and 36 (FIG. 5). Furthermore, the addition of the radial sumps 42 and 44 can be installed in a conventional storage bin with minimal modifications. Moreover, supplemental bin sweeping after emptying the material 54 through all of the available sumps 30, 36, 38, 42 and 44 may be reduced or eliminated by providing satisfactory grain removal through gravity unloading alone. As such, less mechanical sweeping may be required, which may lead to increased grain quality with less grain kernel breakage. In this regard, a more gentle handling method is provided that can preserve a higher quality of grain or material that may otherwise be damaged from traditional auger sweeping. A reduction in loads experienced by the sidewall assembly 14 can also be realized.

Figure 9:
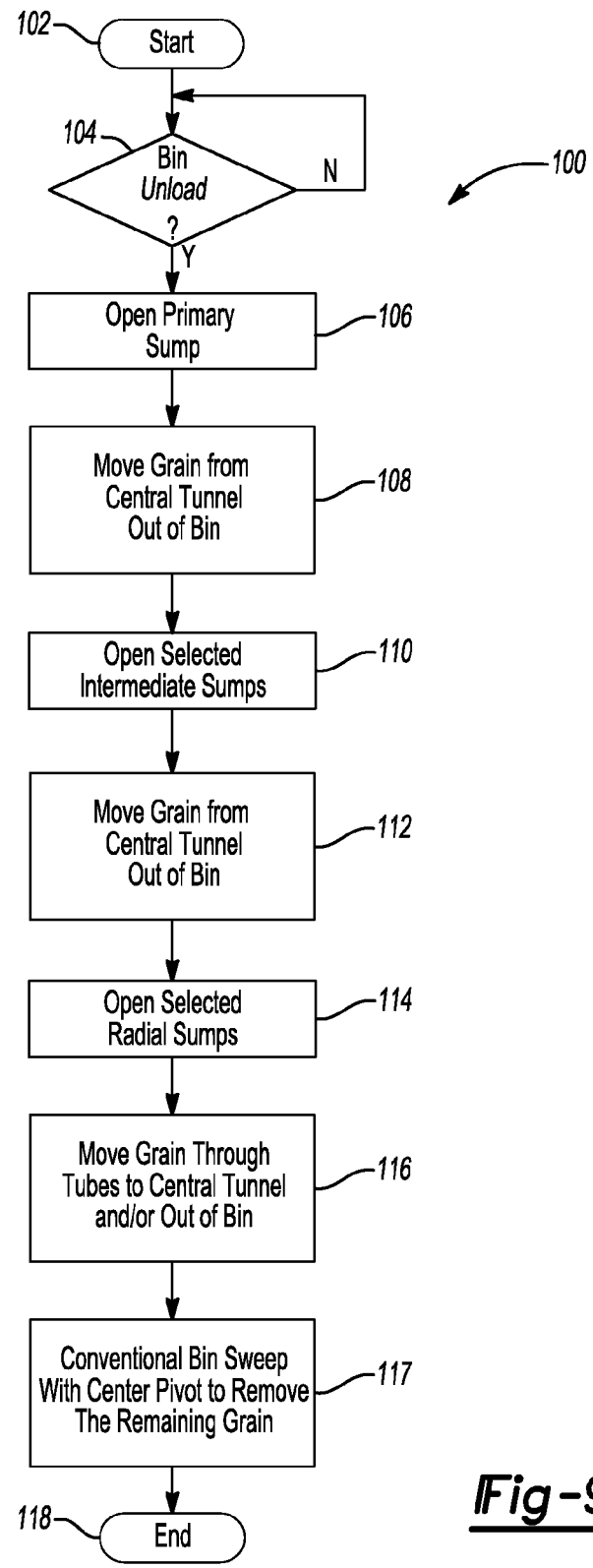
FIG. 9 is an exemplary flow chart of one method of unloading a circular bin according to the present teachings.

With additional reference now to FIG. 9 a method 100 of unloading the storage bin 10 according to one example of the present teachings will be described. The method may be carried out by a sequence of manual opening and activating of various sumps and/or material moving devices provided in respective tunnels as described above. Alternatively, a control device 101 (FIG. 6) may be provided that controls automated opening of various sumps and activation of material moving devices. A hybrid system that incorporates a combination of manual and automated activation may also be employed. The method 100 begins at step 102. In step 104, control determines if an unloading sequence has been initiated. If an unloading sequence has not been initiated, control loops to step 104.

If an unloading sequence has been initiated, the primary sump 30 can be opened in step 106. Material (grain, etc.) 54 is then moved from the central tunnel 32 out of the storage bin 10. In one example, the material transfer device 35 can communicate the material 54 through the cylindrical tunnel 32 and out of the opening 24. The intermediate sumps 38 and 36 can then be opened in step 110. The intermediate sumps 38 and 36 can be opened in a variety of alternating sequences as described above. For example, the front intermediate sumps 38 can be opened in sequence such as 38a to 38e. The rear intermediate sumps 36 can then be opened in sequence such as 36a to 36e. In other examples, the rear sumps 36 can be opened before the front sumps 38. Alternatively, the front and rear sumps 38 and 36 can be opened successively in alternating fashion (e.g., 38a, 36a, 38b, 36b, 38c, 36c, etc.). As another alternative, opposing pairs of sumps (one front and one rear) can be opened together in sequence from 36a with 38a, to 36e with 38e or visa versa. The material 54 can then be moved from the central tunnel 32 out of the storage bin 10. In one example, the material transfer device 35 can communicate the material 54 through the cylindrical tube 34 and out of the opening 24 in step 112. Alternatively, the material transfer device 35 can be a conventional paddle chain drive mechanism typically used with such central tunnels 32.

In step 114, the radial sumps 42 and 44 can be opened. In examples where multiple rings of radial sumps are provided, the inner rings of radial sumps (nearest the primary sump 30) can be opened in sequence before opening any radial sumps that are provided further outward toward the sidewall assembly 14. The material 54 can then be moved through tunnels 46 with the material transfer device 47 to the central tunnel 32 (at the intersection of the connecting tunnels 46d and 46h and the central tunnel in the example shown in FIG. 6) and/or directly out of the storage bin 10 in step 116. Again, material transfer devices 47 provided in tunnels 46 can facilitate delivery of the material 54 to the central tunnel 32 (or alternatively directly out of the storage bin 10). The material transfer device 35 in the central tunnel 32 can communicate the material 54 through the cylindrical tube 34 and out of the opening 24 in step 112. In step 117, a conventional bin sweep having a central pivot can be carried out to remove any remaining grain. Control ends in step 118. In the sump-opening processes described above, it can be important to wait to open a successive sump until after grain has ceased passing through the already-opened sump due to gravity flow.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A circular bin unload system for a storage bin, the unload system comprising:
   a foundation having a floor and a foundation footing;
   a central tunnel formed in the foundation and terminating at a tunnel opening on a perimeter of the foundation, the central tunnel extending along an intersecting plane that generally bisects the floor into a first and a second half-circle;
   a primary grain removal sump formed through the floor of the foundation at a location generally near a centerpoint of the storage bin and connected to the central tunnel;
   at least two radial grain removal sumps formed through the floor of the foundation at locations radially offset from and aligned at substantially the same horizontal height with the central tunnel and located generally between the primary grain removal sump and a sidewall of the storage bin; and
   a connecting tunnel formed in the foundation between the at least two radial grain removal sumps;
   wherein the floor of the foundation is positioned to support grain when the grain is being stored within the grain bin, and wherein grain is unloaded from the storage bin through the connecting tunnel and the central tunnel.

2. The circular bin unload system of claim 1 wherein the at least two radial grain removal sumps comprises:
   a first plurality of radial grain removal sumps arranged on one side of the central tunnel and a second plurality of radial grain removal sumps arranged on another side of the central tunnel.

3. The circular bin unload system of claim 2 wherein a radial grain removal sump of the first plurality of radial grain removal sumps is symmetrically aligned relative to the primary grain removal sump from a corresponding radial grain removal sump of the second plurality of radial grain removal sumps.

4. The circular bin unload system of claim 3, further comprising a first plurality of intermediate grain removal sumps arranged through the floor between the primary grain removal sump and the tunnel opening and generally aligned with the intersecting plane.

5. The circular bin unload system of claim 4, further comprising a second plurality of intermediate grain removal sumps arranged through the floor in an aligned position with the central tunnel and the intersecting plane and located between the primary grain removal sump and the sidewall.

6. The circular bin unload system of claim 3, further comprising a first material transfer device disposed in the central tunnel that is operable to move grain that passes through the primary grain removal sump to the tunnel opening.

7. The circular bin unload system of claim 1, further comprising a first material transfer device that is operable to move grain in the central tunnel to the tunnel opening and a second material transfer device that is operable to move grain that passes through at least one of the radial grain removal sumps through the connecting tunnel and to the central tunnel.

8. The circular bin unload system of claim 7 wherein the connecting tunnel comprises a plurality of connecting tunnels that generally connect with an adjacent radial grain removal sump of the first and second plurality of radial grain removal sumps.

9. The circular bin unload system of claim 8 wherein the plurality of connecting tunnels collectively form a generally circular pattern around the foundation and intersect the central tunnel at two distinct locations.

10. The circular bin unload system of claim 1, further comprising:
    a controller that controls opening and closing of the at least two radial grain removal sumps and operation of the first and second material transfer devices.

11. A grain bin comprising:
    a foundation having a floor for a unitary grain storage area and a foundation footing;
    a central tunnel formed in the foundation and terminating at a tunnel opening on a perimeter of the foundation, the central tunnel extending along an intersecting plane that generally bisects the floor into a first and a second half-circle; and
    a grain removal system including:
      a primary grain removal sump formed through the floor of the foundation at a location generally near a centerpoint of the unitary grain storage area of the grain bin and connected to the central tunnel;
      at least one radial grain removal sump formed through the floor of the foundation at a location radially offset from the central tunnel and the intersecting plane and located generally between the primary grain removal sump and a sidewall and extending through a top surface of the floor into the unitary grain storage area of the grain bin, wherein a connecting tunnel extends from the at least one radial grain removal sump to the central tunnel;
      a first material transfer device extending along the central tunnel to move grain from the unitary grain storage area through the central tunnel;
      a second material transfer device extending along the connecting tunnel to move grain from the unitary grain storage area extending through the connecting tunnel; and
      a controller configured to control opening of the at least one radial grain removal sump subsequent to opening of the primary grain removal sump.

12. The grain bin of claim 11, wherein the at least one radial grain removal sump comprises:
    a first plurality of radial grain removal sumps arranged on one side of the central tunnel and a second plurality of radial grain removal sumps arranged on another side of the central tunnel.

13. The grain bin of claim 12, wherein the controller is configured to sequentially open individual grain removal sumps of the first and second plurality of radial grain removal sumps, wherein one of the first plurality of radial grain removal sumps and one of the second plurality of radial grain removal sumps are simultaneously opened.

14. The grain bin of claim 12, wherein the controller controls operation of the first and second material transfer devices.

* * * * *